Sept. 24, 1963
E. B. BAHNSEN
3,104,844
DEVICE FOR DISPENSING SHEET MATERIAL
Filed Jan. 26, 1961
6 Sheets-Sheet 1
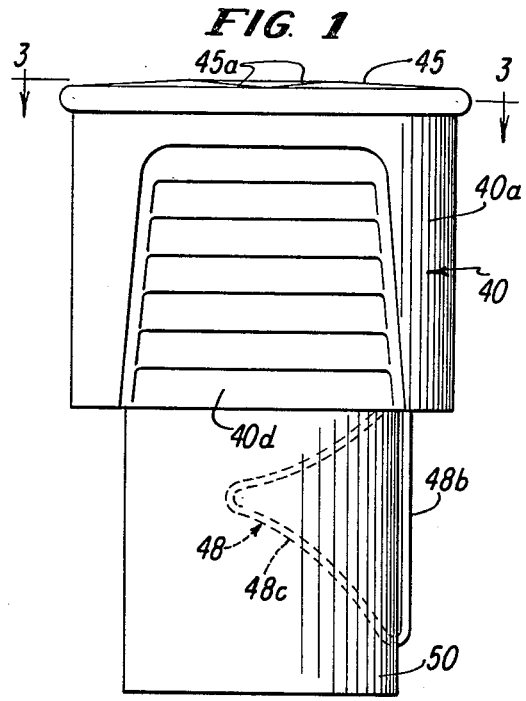
FIG. 1
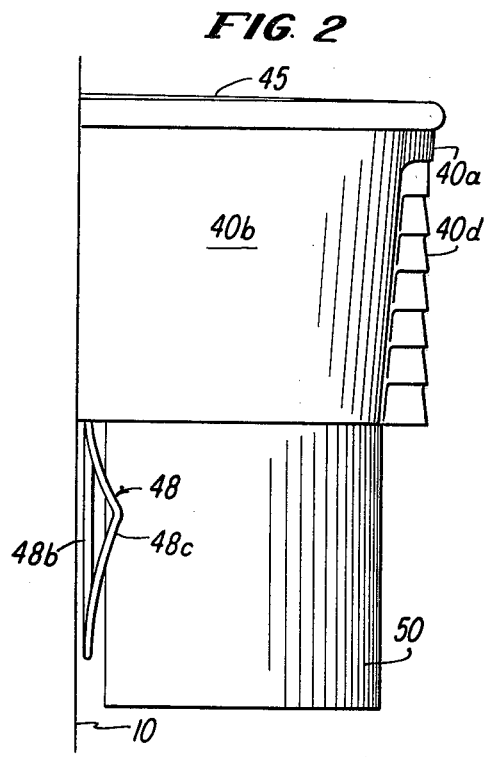
FIG. 2
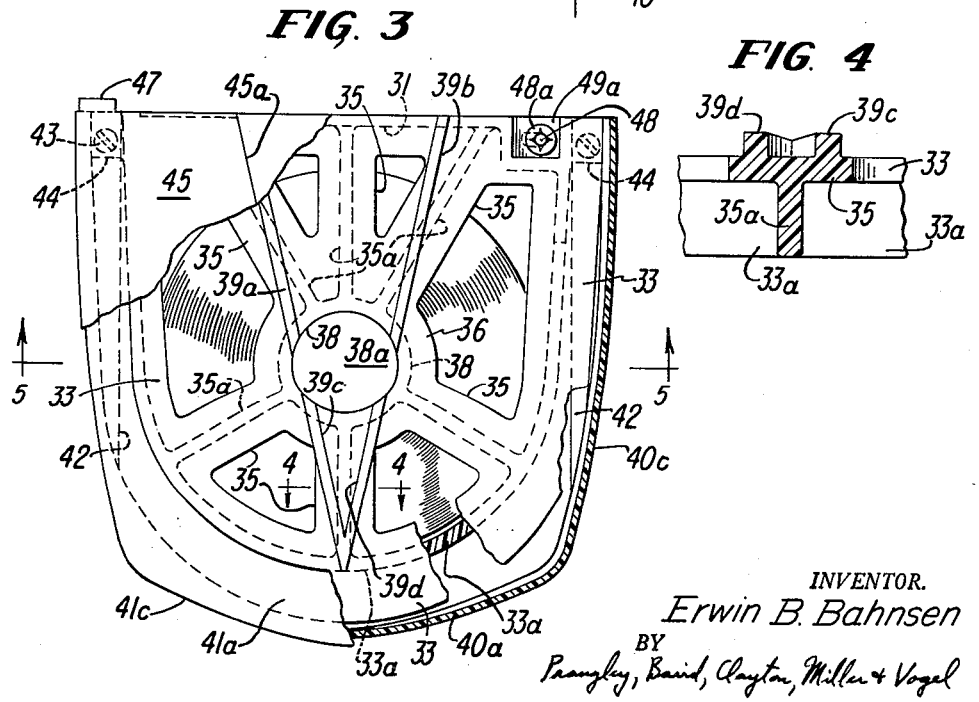
FIG. 3
FIG. 4
INVENTOR.
Erwin B. Bahnsen
BY
Pangley, Baird, Clayton, Miller & Vogel
Attys.

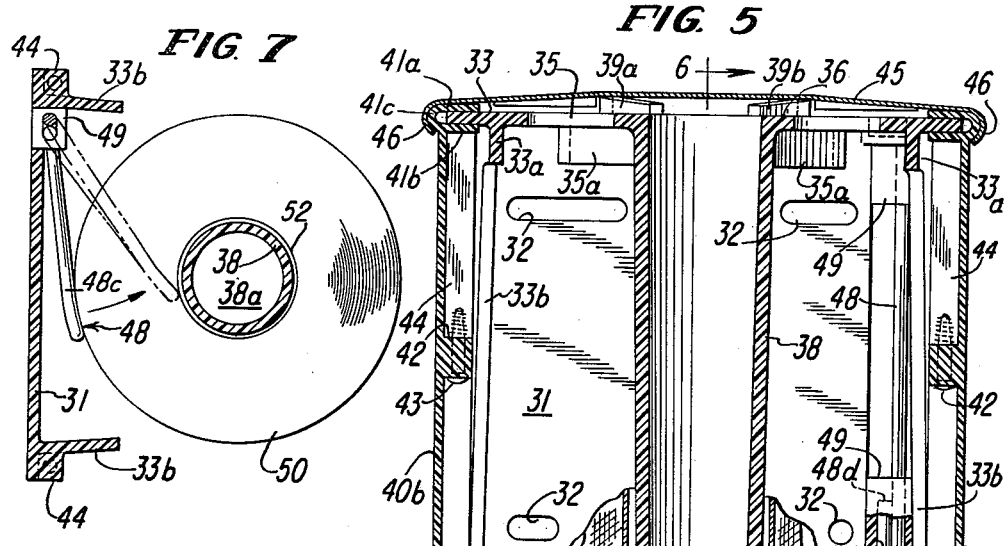
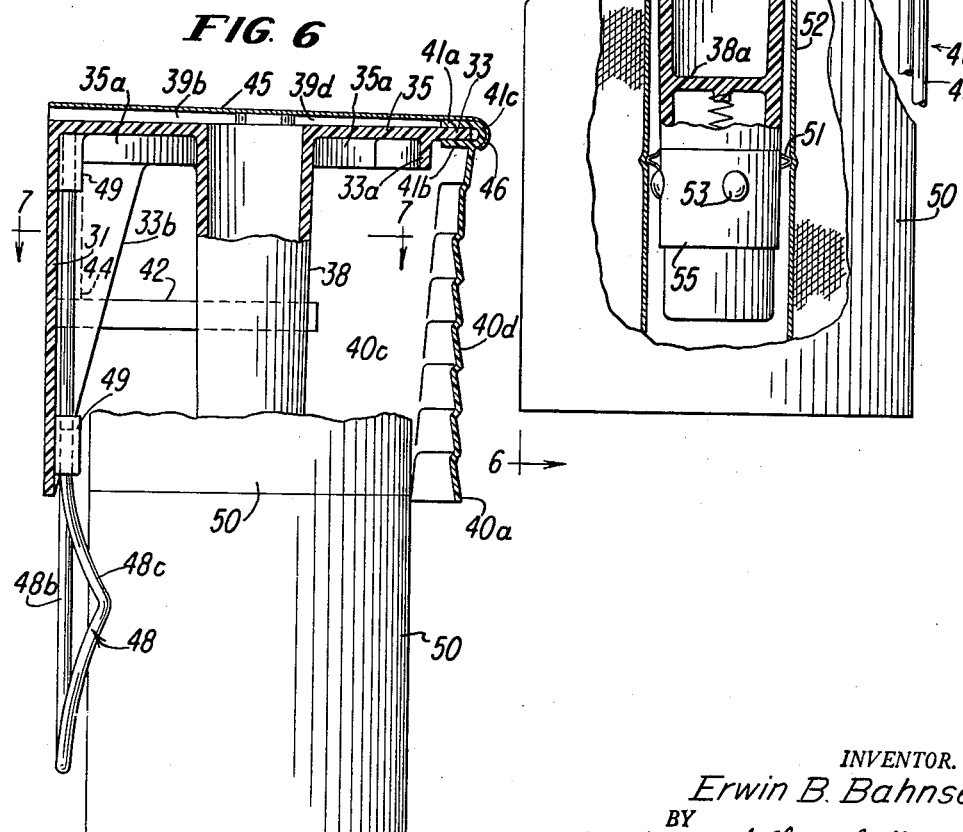

Sept. 24, 1963   E. B. BAHNSEN   3,104,844
DEVICE FOR DISPENSING SHEET MATERIAL
Filed Jan. 26, 1961   6 Sheets-Sheet 3

INVENTOR.
Erwin B. Bahnsen
BY
Pringley, Baird, Clayton, Miller & Vogel
Attys.

INVENTOR.
Erwin B. Bahnsen

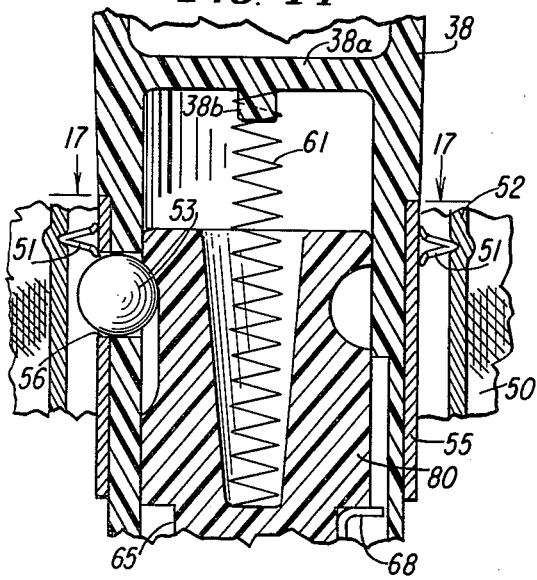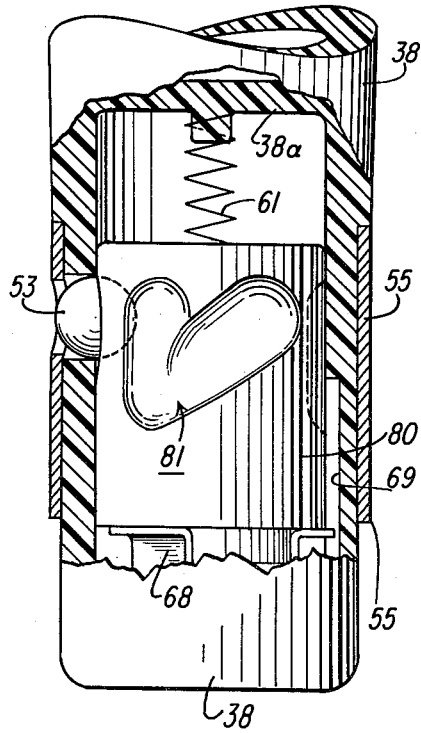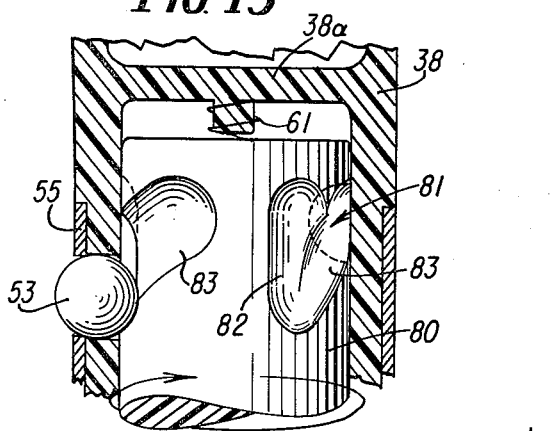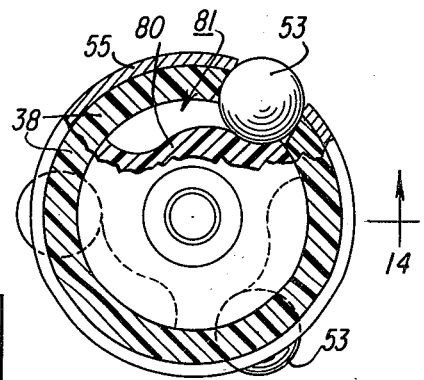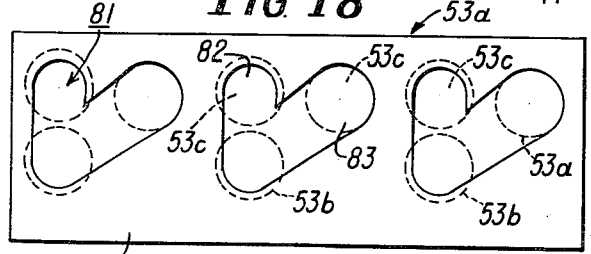
INVENTOR.
Erwin B. Bahnsen

Sept. 24, 1963 E. B. BAHNSEN 3,104,844
DEVICE FOR DISPENSING SHEET MATERIAL
Filed Jan. 26, 1961 6 Sheets-Sheet 6
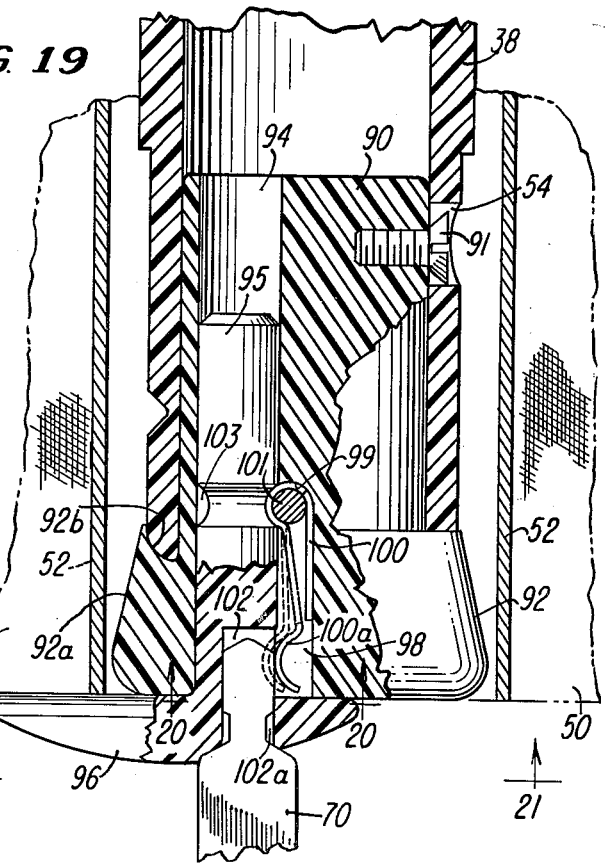
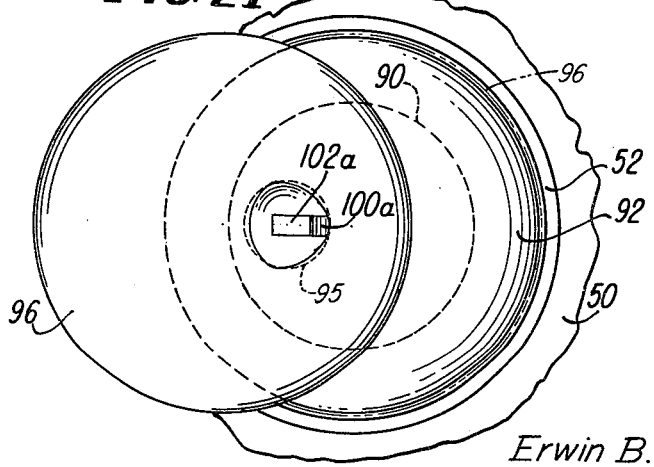
INVENTOR.
Erwin B. Bahnsen
BY
Prangley, Baird, Clayton, Miller & Vogel
Attys.

United States Patent Office 3,104,844
Patented Sept. 24, 1963

3,104,844
DEVICE FOR DISPENSING SHEET MATERIAL
Erwin B. Bahnsen, Hinsdale, Ill., assignor to Steiner American Corporation, Salt Lake City, Utah, a corporation of Nevada
Filed Jan. 26, 1961, Ser. No. 85,050
19 Claims. (Cl. 242—55.42)

This invention relates to a dispenser for hollow cored paper rolls such as rolls of toilet tissue and it is an object of the invention to provide improved apparatus of this character.

A dispenser constructed in accordance with the present invention is particularly adapted to an application wherein it is desired that one paper roll be maintained in a dispensing position and one or more additional paper rolls be held in reserve within a protective casing. In such an application, it is generally desired that the dispenser be so arranged as to prevent unauthorized removal of the exposed paper roll except in the normal manner of dispensing, and that after complete dispensation of the exposed roll, the core thereof be readily removable by tearing such that a reserve roll may move into dispensing position. It is necessary, of course, that the dispenser be operable to permit insertion of paper rolls. A dispenser constructed in accordance with the present invention is adapted to these and other functions while being of extremely economical construction and of very simple and reliable operation.

Accordingly, it is another object of the invention to provide improved dispensing apparatus of the character described above, the basic structure of which is extremely economical to manufacture.

It is a further object of the invention to provide an improved dispenser of the character defined above which is easily and economically installed.

It is a still further object of the invention to provide an improved dispenser of the character defined above incorporating a very simple, economical, and easily operated locking means for preventing unauthorized removal of paper rolls and permitting the installation of new or fresh rolls.

Another object of the invention is to provide an improved dispenser of the character defined above in which locking means for preventing unauthorized removal of paper rolls are releasable by the simple turn of a key and are returnable to locking position by finger tip depression of a push button.

A further object of the invention is to provide an improved dispenser of the character defined above which is adapted to handle hollow cored paper rolls in which the core thereof has a smooth interior surface.

A still further object of the invention is to provide an improved dispenser of the character defined above which is readily adapted to the handling of hollow cored paper rolls either having a ring extending radially inwardly from the interior surface of the core or having a core of smooth interior surface.

It is a further object of the invention to provide an improved dispenser of the character defined above and having various of the features referred to above while being reliable and foolproof in operation.

Further features of the invention pertain to the particular arrangement of the elements of the paper roll dispenser, whereby the above outlined and additional features thereof are attained.

The invention, both as to its organization and method of operation, together with further objects and advantages thereof, will best be understood by reference to the following specification, taken in connection with the accompanying drawings, in which:

FIGURE 1 is a front elevational view of a dispenser embodying the present invention, a paper roll being shown in dispensing position;

FIG. 2 is a side elevational view of the same apparatus;

FIG. 3 is a cross-sectional view taken substantially along the line 3—3 of FIG. 1, with certain parts broken away for clearness of understanding;

FIG. 4 is a partial cross-sectional view on an enlarged scale taken in the direction of the arrows along the line 4—4 of FIG. 3;

FIG. 5 is a cross-sectional view taken in the direction of the arrows along the line 5—5 of FIG. 3;

FIG. 6 is a cross-sectional view taken in the direction of the arrows along the line 6—6 of FIG. 5;

FIG. 7 is a partial or fragmentary cross-sectional view taken in the direction of the arrows along the line 7—7 of FIG. 6;

FIG. 14 is an enlarged cross-sectional view similar to FIG. 8 but illustrating a different embodiment of the locking device;

FIGS. 15 and 16 are views similar to FIG. 14 but illustrating the apparatus in different operating positions;

FIG. 17 is a cross-sectional view taken in the direction of the arrows along the line 17—17 of FIG. 14;

FIG. 18 is a development of a generally cylindrical plug incorporated in the locking apparatus of FIGS. 14–16;

FIG. 19 is an enlarged cross-sectional view similar to FIG. 8 but illustrating still another embodiment of the invention;

FIG. 20 is a further enlarged cross-sectional view taken in the direction of the arrows along the line 20—20 of FIG. 19; and, FIG. 21 is a bottom plan view of the locking apparatus illustrated in FIG. 19.

Figure 8:
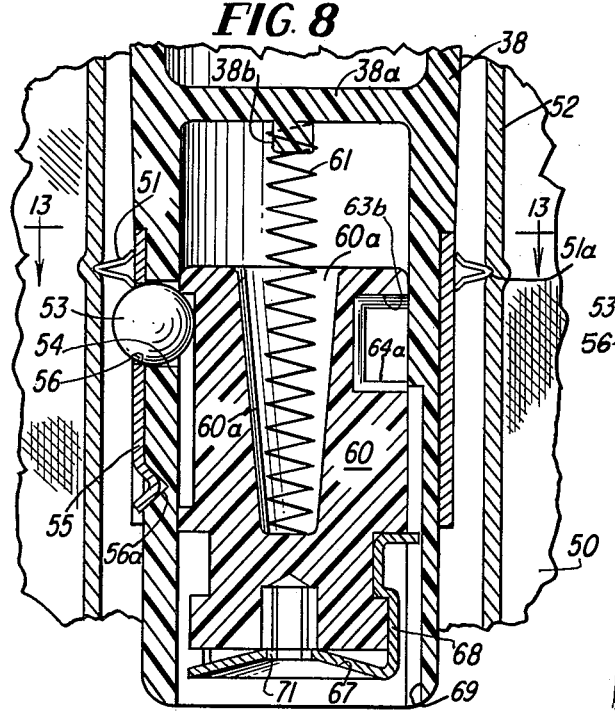
FIG. 8 is an enlarged cross-sectional view taken substantially through the center line of tissue roll locking apparatus incorporated in the dispenser of FIGS. 1 to 7.

The various embodiments of the invention illustrated in the drawings employ the same housing and other basic structure which, of itself, constitutes one of the features of the present invention. The housing includes a frame which is intended to be secured to a wall or other supporting means and which in turn supports all other parts of the dispenser. The frame includes a rear vertical wall 31 having suitable openings 32 therein, as shown in FIG. 5, to facilitate securing of the frame to a supporting member, such as a wall 10 (FIG. 2), as by screws or other fasteners. A generally horse-shoe shaped rim 33 extends horizontally and forwardly from the upper edge portion of the rear wall 31, as best seen in FIG. 3, the front or outwardmost extending portion preferably being generally arcuate in form. This rim, as best seen in FIG. 5, includes a horizontally extending flange and a web 33a extending downwardly from the central portion thereof. Throughout most of the length of the rim 33 the web 33a is of the depth illustrated in cross-section in FIG. 5, but closely adjacent the rear wall 31 of the frame the web 33a at its opposite ends joins or merges with webs 33b which are integral with the rear wall 31 and extend vertically therealong. The web 33a and the web 33b thereby form a gusset which strengthens and stiffens the rim 33.

A series of generally horizontal ribs 35 converge radially inwardly in spoke-like fashion from the rim 33 and from the upper edge portion of the rear wall 31 to form a central hub 36, each of the ribs 35 including a horizontal flange 36, and a centrally located, downwardly extending reinforcing web 35a. Extending downwardly from the hub 36 there is a hollow depending post 38 which is slightly tapered in the interest of ease of manufacture. The post, as will later be seen, is adapted to receive two rolls 50 of toilet tissue or the like thereon, one above the other. The webs 35a of the ribs 35 at their inner ends extend to and are integral with the post 38 and at their outer ends they are integral with either the rear wall 31 or the web 33a of the rim 33. The frame construction, as thus far described, is further strengthened by a pair of low upstanding ribs 39a and 39b which are integral with two of the angularly disposed rear ribs 35 and extend across the top thereof from the rear of the frame, in converging fashion, to the hub 36. In addition, there are two low upstanding ribs 39c and 39d, constituting an extension of the ribs 39a and 39b, which extend across the top of the frontmost rib 35 and are integral therewith, these two ribs 39c and 39d converging at the front of the frame, as best seen in FIGS. 3 and 4. The upper edges of the ribs 39a, 39b, 39c and 39d slope downwardly at a substantially uniform angle, from rear to front, and serve to support the central portion of a top or cap 45 hereinafter described.

The rear wall 31, the rim 33, the ribs 35 and the post 38, along with all of the above mentioned reinforcing webs and ribs are preferably an integral molding of synthetic plastic material such as Cycolac or the like. As will be readily apparent to those skilled in the art, the frame described above, by the nature of its formation and integral construction, is inherently strong and shock-resistant while, at the same time, being very economical to manufacture as an integral, single piece, plastic molding.

A U-shaped, single-piece casing 40, likewise of plastic, is provided for enclosing the front and sides of the frame just described and for enclosing the spare or uppermost one of two rolls of toilet tissue 50 which may be received upon the post 38, the casing being provided with a curved front wall 40a and rearwardly extending side walls 40b and 40c. The front wall 40a may be provided with a fluting-like configuration for decorative purposes if desired, as shown at 40d. The upper edges of the front and side walls 40a, 40b and 40c of the casing have integrally formed thereon a pair of vertically spaced-apart, inwardly extending flanges 41a and 41b which are joined together at their outer edges by a rounded bead-like formation 41c which extends outwardly slightly with respect to side walls 40b and 40c and the front wall 40a of the casing, as best seen in FIGS. 5 and 6. These spaced-apart flanges 41a and 41b, together with the bead-like formation 41c, provide an inwardly opening U-shaped groove which is slidably received upon the outwardly extending rim 33, thereby providing an extremely simple and easy means for assembling the casing 40 upon the frame after the frame has been secured to the wall 10 by means of screws or the like driven into the wall 10 through the openings 32 in the back 31 of the frame. The assembly is accomplished merely by locating the casing 40 in front of the frame, with the groove in alignment with the rim 33, and then sliding the casing rearwardly with the groove embracing the rim. With the casing in its fully assembled position on the frame, as shown in the drawings, the rim 33 is deeply seated throughout its periphery in the groove, thereby firmly supporting the casing 40 on the frame structure.

This easy mode of assembling the casing 40 upon the frame is completed by securing the casing to the back wall 31 of the frame structure. For this purpose the inner surfaces of the side walls 40b and 40c of the casing are each provided with a rearwardly extending reinforcing block or pad 42 integrally molded thereon. The respective rear ends of these two blocks slide under corresponding blocks or pads 44 integrally formed on the rear wall 31 of the frame as the casing 40 becomes fully seated upon the rim 33. The rear end portions of the blocks or pads 42 are each provided with a tapped hole containing a self-tapping screw 43, the screws being driven into the blocks or pads 44 to complete the assembly of the casing 40 upon the frame. The overlapping contact of the blocks 44 with the blocks 42, together with the screw connections therebetween, further rigidifies the casing 40 with respect to the frame.

A top or cap 45 is also provided for closing the top of the assembly, the cap being applied to the casing 40 before the casing is slid into position upon the frame. This cap is preferably of sheet metal with a suitable finish such as chrome plate. The cap has a configuration corresponding to shape of the top of the casing 40, the cap being slightly crowned by two forwardly converging lines of fold 45a (FIG. 1) and being provided along its side and front edges with a downwardly rolled or curled edge 46 adapted to slide rearwardly upon and embrace the bead-like formation 41c on the casing 40, as best seen in FIGS. 5 and 6. It will thus be apparent that the cap 45 may be slid onto the casing 40 in much the same manner as the casing 40 is slid onto the frame. At the rearward edge of the cap 45 there are a pair of tabs 47 which extend rearwardly of the flange construction 41a and 41b of the casing. After the cap 45 has been slid into position upon the casing 40, the tabs 47 are bent down to lock the cap to the casing. These tabs 47, of course, are disposed or pinned between the rear edges of the flanges 41a and 41b of the casing and the wall 10 when the casing has been assembled upon a mounted frame. Thus, the tabs are inaccessible in a fully mounted assembly and the cap 45 cannot be removed from the casing 40 unless the casing 40 is first displaced from its fully seated and secured position upon the frame.

It will be noted that the lines of fold 45a, which give to the cap its slightly crowned shape, overlie the low sloping top ribs 39a, 39b, 39c and 39d. These ribs therefore serve the double purpose of reinforcing the frame structure and reinforcing or supporting the slightly crowned central portion of the cap 45.

A very effective, but simple and inexpensive brake device 48 is embodied on the frame structure to retard the rotation of the roll of toilet tissue 50 which is in the lower or exposed position on the post 38 so as to prevent free spinning of the roll and its core 52 about the post, and thus avoid wasteful withdrawal of tissue from the roll. The brake 48 comprises a single length of spring wire or the like which extends upwardly through suitable openings provided in a pair of vertically spaced blocks or pads 49 that are formed integrally upon the forward face of the rear wall 31 of the frame, as perhaps best seen in FIGS. 5 and 6. The uppermost end of the spring wire extends completely through the upper block 49 and into a recess 49a at the top of the frame where the upper extremity of the wire has received thereon a suitable friction type fastener 48a (FIG. 3) to prevent the brake device from falling downwardly out of the blocks or pads 49. From the lowermost pad or block 49 the spring wire extends straight downwardly, as at 48b (FIGS. 1 and 2), to a point well below the center level of the lowermost roll 50, then laterally in a loop 48c, and thence back to the lower pad or block 49, where the lower end 48d of the spring wire is received in a socket 49b formed in the lower end of the block, the socket being alongside the previous mentioned opening through which the shank 48b of the spring extends.

The brake device 48 is a torsion spring apparatus and is so formed that in its unstressed condition the free end 48d of the loop would occupy a position rearwardly of the wall 31. Thus, the device is initially stressed when the free end 48d of the loop is in effect pulled forwardly of its normal position and inserted into the socket or recess 49b. Because the free end 48d tends to seek its rearward or normal position, the loop 48c is urged toward the post 38, with the result that the loop, due to the torsion and stress created in the brake device, resiliently engages and rides upon the periphery of the lower roll 50 to prevent its spinning, the loop being constantly urged radially inwardly with respect to the roll. As the paper on the lower roll is withdrawn, the loop of the spring device is caused by the stressed condition of the device to continue to ride upon and hug the periphery of the roll, so that when substantially all of the paper on the roll has been withdrawn from its core 52, the loop will occupy or approach the position thereof shown in broken lines in FIG. 7.

Means are provided upon the lower end portion of the post 38 for rotatably supporting the two toilet tissue rolls 50 thereon, one above the other, the lower roll being in an exposed position wherein toilet tissue may be withdrawn therefrom as needed, and the upper roll being in a covered, reserve position. When the supply of tissue on the lower roll is exhausted, its core 52, which is normally of paper, is torn or ripped off of the post 38, thereby permitting the upper roll to drop downwardly to the exposed or dispensing position whereupon dispensing of paper will continue from the second roll. The roll support means at the lower end of the post 38, as will later be explained, is such as to support the rolls on the post and at the same time permit easy installation of fresh rolls upon the post.

In the embodiments of the invention illustrated in FIGS. 1 through 18, the roll support mechanisms, which will be described in detail hereinafter, serve to support rolls 50 which are each provided internally of its core 52 with a radially inwardly projecting ring 51. Such rings are fully illustrated and described in detail in U.S. Letters Patent No. 2,726,824. The rings are of a type which expand when they are compressed axially, whereby the outer periphery 51a (FIG. 8) of each ring is pressed and embedded in the inner core 52 of a roll 50 to fix the ring therein, the inner periphery 51b of each ring having a diameter slightly greater than that of the post 38 so that each roll may rotate freely about the post, and the inner periphery of each ring providing a track-like support surface by means of which the lowermost roll on the post may be vertically supported. The ring 51 of the lowermost roll 50 is arranged to rest upon three balls 53 which are arranged in openings 54 in the wall of the post 38, whereby the lowermost roll 50 is supported in dispensing position. The balls 53 are limited in radially outward movement with respect to the post 38 by a band 55 of metal or the like which encircles the post 38 and has openings 56 therein of slightly smaller diameter than the balls 53. The band 55 may be pressed on one side thereof into a notch 56a in the wall of the post 38, thereby to lock the band in position on the post.

Figure 9:
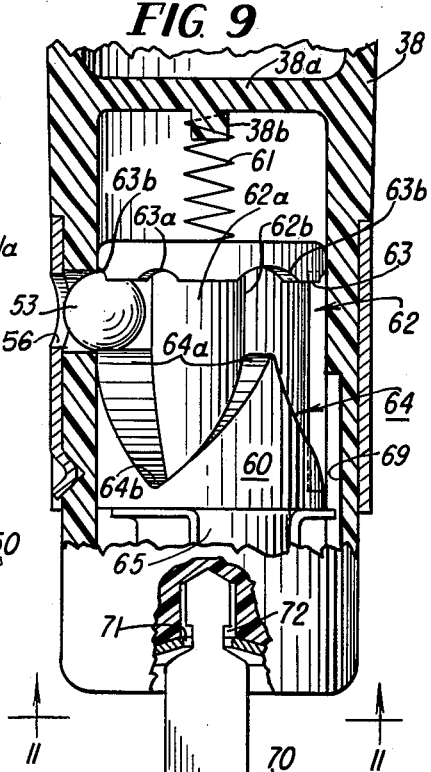
FIGS. 9 and 10 are views similar to FIG. 8 but showing the locking apparatus in different operating positions.

Referring now to FIGS. 8–13, a plug 60, preferably formed of plastic, is slidably and rotatably supported within the lower end of the post 38 for selectively camming the balls 53 radially outwardly, as in FIG. 8, to support a roll 50 and for permitting radial retraction of the balls as in FIG. 9, to permit easy insertion or removal of paper rolls. This plug is biased outwardly or downwardly of the post 38 by a compression spring 61, one end of which is received within a well 60a in the plug 60. The other end of this spring bears against a transverse interior wall 38a, which is integral with the post 38, and encircles a protrusion 38b as shown. This arrangement maintains the spring in centered position and permits the use of a spring of substantial length.

Figure 13:
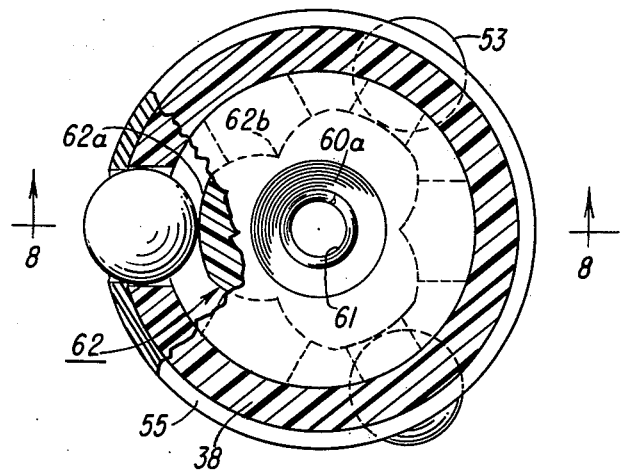
FIG. 13 is a cross-sectional view taken in the direction of the arrows along the line 13—13 of FIG. 8.

The plug 60 is provided with a recessed peripheral cam surface 62 having three equally spaced high points or raised surface areas 62a and intermediate low points 62b, as best seen in FIG. 13. As may readily be seen, when the plug 60 is angularly oriented such that its high points 62a lie opposite the balls 53, the latter are maintained radially outwardly. This angular orientation is herein referred to as the locking orientation of the plug. Conversely, when the plug 60 is angularly oriented such that its low points 62b lie opposite the balls 53, the latter are permitted to retract, as illustrated in FIG. 9. This latter angular orientation of the plug 60 is herein referred to as the releasing orientation of the plug.

Above the cam surface 62 the plug 60 is provided with an annular shoulder 63 which is engageable with the balls 53 to limit outward or downward movement of the plug 60, even when the balls 53 are in their radially outward positions, as in FIG. 8. The annular shoulder 63 is provided with a series of three recesses 63a lying directly above the high points of the cam 62. When the plug 60 is in locking orientation, and the spring 61 is permitted to move the plug 60 axially outwardly, the balls 53 are received within the recesses 63a, whereby pressure of the spring 61 tends to maintain the plug 60 in locking orientation. A second series of three recesses 63b are provided in the shoulder 63 directly above the low points 62b of the cam surface 62 and are arranged to receive the balls 53 when the plug 60 is in releasing position.

A second or lower shoulder-like cam surface 64 is developed on the plug 60 having high points 64a extending upwardly, these high points lying substantially in alignment with, but slightly to one side of the low points 62b of the cylindrical cam 62. Low points 64b on the cam 64 lie substantially in alignment with the high points 62a of the cam 62.

Figure 12:
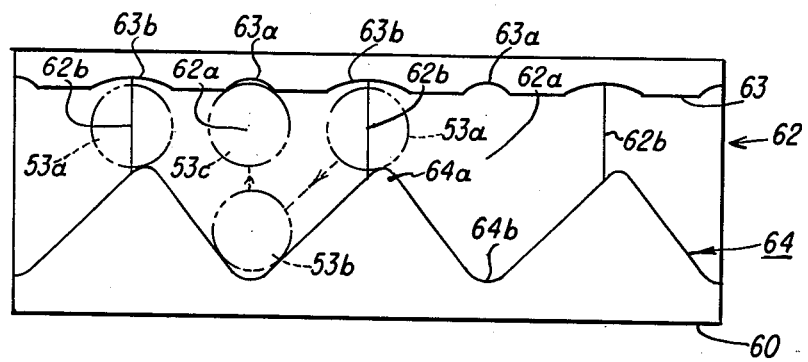
FIG. 12 is a development of a generally cylindrical plug incorporated in the locking apparatus of FIGS. 8–10 and illustrating the various operating positions shown in FIGS. 8–10.

Reference is now made to FIG. 12 which is a development of the cams 62 and 64 and the annular shoulder 63 of the plug 60. Let it be assumed that the plug 60 is in releasing orientation, the balls 53 lying radially opposite the low points 62b of the cylindrical cam 62 and being received by recesses 63b in the annular shoulder 63. This ball position is designated 53a in FIG. 12. The balls 53 have presumably been moved radially inwardly against the low points 62b of the cylindrical cam 62 by insertion or withdrawal of a roll of toilet tissue. However, it will make no difference in the subsequently described operation of the plug 60 whether the balls 53 have been moved radially inwardly to their retracted position or have remained in their radially outward positions.

Figure 10:
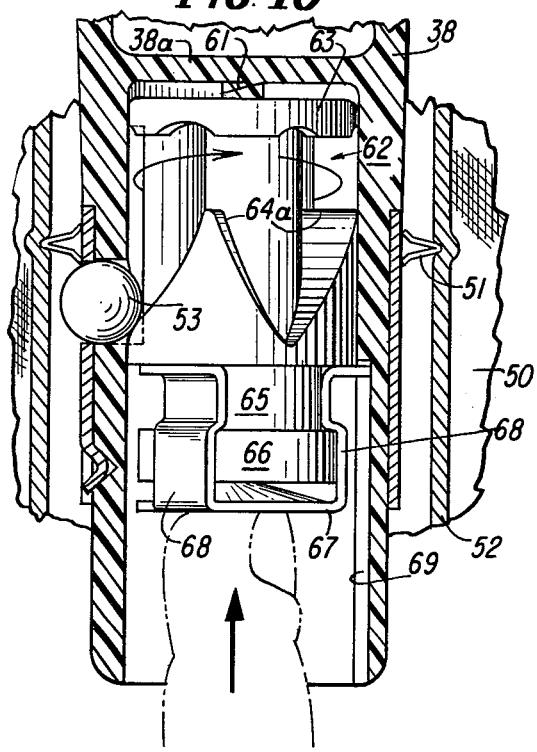
Figure 11:
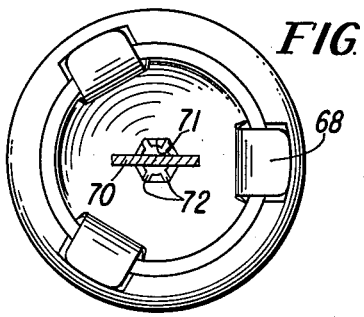
FIG. 11 is a bottom plan view of the locking apparatus illustrated in FIGS. 8–10.

In order to move the plug 60 to its locking orientation, it is necessary only that it be pushed axially inwardly from the position of FIG. 9 to the position of FIG. 10. It will be apparent upon reference to FIG. 12 that initial inward or upward movement of the plug 60 brings the high points 64a of the cam 64 against the balls 53 slightly to one side of the center thereof. Further inward movement of the plug causes angular rotation of the plug so that the balls 53, in effect, move relatively from positions 53a to positions 53b. Further inward movement of the plug is prevented when the balls 53 have moved, relatively, to the low points 64b of the cam 64, this being the position illustrated in FIG. 10. It will be noted that the balls 53 now lie opposite the high points 62a of the cam 62 and are thus in their extended position in the openings 54 and 56.

If the plug 60 is now released such that the spring 61 may move the plug axially outwardly or downwardly of the post 38, the balls 53 will move relatively from positions 53b (FIG. 12) to positions 53c wherein they are received by the recesses 63a of the annular shoulder 63. The plug is, therefore, now maintained in locking orientation by the pressure of the spring 61 and the cooperation of the recesses 63a with the balls 53. It should be noted that movement of the plug 60 into locking orientation is accomplished by mere finger pressure against the outer end of the plug. Any time that the plug 60 is moved inwardly against the action of the spring 61, the plug is necessarily moved into locking orientation.

Further in connection with FIG. 12, it should be noted, as previously suggested, that the high points 64a of the cam 64 are located slightly to the right of the recesses 63b and the low points 62b of the cylindrical cam 62. This assures that a force directed inwardly or upwardly against the plug 60 will result in all of the high points 64a of the cam 64 engaging the corresponding balls 53 substantially off center, whereby each of the high points 64a is urged in the same angular direction with a substantial component of the applied force. Expressed differently, each of the balls 53 tends to move relatively down corresponding sides of the peaks of the cam 64.

Below the cam 64, the plug 60 is provided with a neck 65 of reduced diameter and a flange 66 of greater diameter than the neck 65. The guard member 67 is mounted on the lower end of the plug, this guard member including a dished, plate-like lower portion and three upwardly extending arms 68. The arms 68 are bent over the flange 66 and against the neck 65, and at their upper ends are bent outwardly and extend into vertically extending grooves 69 in the inner suface of the post 38. The guard member 67 is thereby prevented from rotation with respect to the post 38 but is free to move axially with respect thereto. The arms 68 of the guard member are so formed as to engage the plug loosely, whereby the plug is free to rotate within and with respect to the guard member 67. Accordingly, axially inward movement of the guard member 67, as by finger-tip pressure in the direction of the heavy arrow in FIG. 10 causes axially inward movement of the plug 60 and permits rotation of the plug under the influence of the balls 53 and the cam 64, such angular movement of the plug always being toward locking orientation. It should be noted that under no circumstances can the plug 60 be moved to releasing orientation by finger-tip manipulation.

A key 70 is provided for moving the plug from locking orientation to releasing orientation. An opening 71 is provided in the guard member 67 for permitting entrance of the head of the key into any of three slots 72 in the bottom of the plug 60. With the head of the key inserted through the opening 71 and into a slot 72, the key may be twisted, preferably with a slight inward or upward pressure, to lift the recesses 63a away from the balls 53, whereby the plug is readily rotatable to releasing orientation.

In the assembly of the apparatus of FIGS. 8–13, the guard member 67 is first arranged on the plug 60 after which the spring 61 and the plug 60 are inserted into the post 38. The balls 53 are then inserted into the openings 54. With the plug in its releasing orientation, the balls may retract such that the band 55 may be slid upwardly onto the post and pressed into the notch 56a. These parts are thereby supported upon and within the post 38 and are limited in their movements with respect thereto as described above for rotatably supporting the rolls 50 and for releasing the same and permitting easy installation of fresh rolls.

The embodiment of the roll support and locking mechanism illustrated in FIGS. 14–18 is identical to that described above with the exception of differences in the formation of the cams. In general the equivalent of the two cams 62 and 64 of the embodiment of FIGS. 8–13 are incorporated in a single configuration in the embodiment of the device illustrated in FIGS. 14–18. A generally cylindrical plastic plug 80 is provided having formed in the peripheral surface thereof three generally V-shaped recesses 81, as is best seen in the development thereof shown in FIG. 18. Each recess includes a vertical leg 82 and a diagonally upwardly sloping leg 83 which join at their lower ends.

The recess 81 is deep at the upper end of the leg 83 whereby a ball 53 arranged opposite that portion of the recess may retract to the position illustrated in FIG. 16. The recess becomes substantially shallower toward the lower end of the leg 83, whereby a ball 53 arranged opposite the lower, common ends of the two legs 82 and 83 is caused to protrude beyond the wall of the post 38 in the manner illustrated in FIG. 15. The entire vertical leg 82 is shallow in depth, whereby a ball 53 arranged opposite the upper end of the vertical leg 82 is also caused to protrude beyond the wall of the post 38, as illustrated in FIG. 14. The bottom wall of each recess 81 therefore comprises, in effect, a cylindrical or peripheral cam, with high and low surfaces thereon, which is the equivalent of one-third of the surface of the cylindrical cam 62 of FIGS. 8–13, the low point being at the upper end of the leg 83 and the high point being along the entire length of the vertical leg 82.

The lower side wall of the sloping leg 83, on the other hand, is the equivalent of the effective portion of the cam 64, the high point thereof being in axial alignment with the low point of the cylindrical cam at the upper end of the leg 83, and the low point thereof being in axial alignment with the high point of the cylindrical cam.

The recesses 81 provide, furthermore, the equivalent of the annular shoulder 63 with its two series of recesses 63a and 63b. The upper or axially inward wall of each recess 81 comprises the equivalent of the shoulder 63, the upper end of the vertical leg 82 being the equivalent of a recess 63a and the upper end of the sloping leg 83 being the equivalent of a recess 63b.

With the plug 80 lowered and so oriented that the balls 53 lie within the upper ends of the sloping arms 83, the balls are permitted to retract. This relative position of a ball 53 is designated 53a in FIG. 18, and corresponds to the releasing orientation of the plug 80. Downward pressure of the spring 61 tends to retain the plug in this position, as will be apparent to those skilled in the art. The plug 80 may be raised or moved axially upwardly by finger-tip pressure against the guard member 67, as in the first described embodiment of the invention. Such inward movement of the plug is necessarily accompanied by angular rotation of the plug in the direction of the circular arrow in FIG. 15 such that the balls 53 move, relatively, to the lower ends of the arms 83. This position of the plug and balls is illustrated in FIG. 15, and the relative position of the balls is designated 53b in FIG. 18. Such movement is also accompanied by radially outward movement of the balls 53, assuming that they had previously been caused to move to their retracted position.

Upon release of finger-tip pressure, the plug 80 is moved axially downwardly by the spring 61 whereby the balls 53 move relatively toward and into the upper ends of the vertical arms 82, this position being illustrated in FIG. 14 and designated 53c in FIG. 18. Spring pressure retains the balls in the upper ends of the arms 82 of the recesses 81, whereby rotation of the plug 80 is prevented.

As in the case of the embodiment of FIGS. 8–13, mere inward depression of the plug 80 against the action of the spring 61, and subsequent release of the plug, invariably leaves the plug in locking orientation. The plug may be moved to releasing orientation only through use of the key 70 in the manner, described above in connection with the embodiment of FIGS. 8–13, the bottom portion of the plug 80 being constructed precisely like the bottom portion of the plug 60, with the same guard 67, 68 thereon and provided with the same key slots 72 therein.

In FIGS. 19 to 21 there is shown a modification of the dispenser described above, which modification can quickly and easily be made to adapt the dispenser for accommodating rolls of tissue 50 which have ordinarily hollow cylindrical or tubular cores 52 therein which have not been provided with the support rings 51. In this modification, it will be observed, the metal sleeve 55 has been removed from the lower end of the post 38, thus permitting removal of the balls 53 through the openings 54 in the post and removal of the plastic plug 60 or 80 and the coil spring 61 from the interior of the post 38. In place of these parts so removed a generally cylindrical plug 90, preferably of plastic, is inserted into the lower end of the post 38 and maintained therein in fixed position by a plurality of screws 91 threaded radially into the plug with their respective heads residing in the openings 54 of the post 38. The plug 90 has a diameter only slightly less than that of the interior of the lower end of the post 38 so that the heads of the screws 91 disposed within the openings 54 hold the plug in place. The plug 90 has an enlarged integral lower end 92 having a maximum diameter that is somewhat less than the internal diameter of the cores 52 of the tissue rolls 50 to be supported about the post 38. The sides of the enlarged end portion 92 of the plug 90 slope upwardly as at 92a, and an annular recess 92b is provided adjacent the upper ends of these sides for receiving the lowermost end of the post 38, as seen in FIG. 19.

The plug 90 and its lower end portion 92 are provided with a vertically extending bore 94 which is eccentrically located with respect to the axis of the post 38 and the plug 90. Arranged within the bore 94 is a plastic shaft 95, and at the lower end of this shaft and integral therewith there is formed a disc 96 which is arranged generally perpendicular to the axis of the shaft 95 and eccentric with respect thereto. Preferably, the eccentricity of the bore 94 with respect to the axis of the post 38 is substantially equal to the eccentricity of the disc 96 with respect to the axis of the shaft 95, whereby the disc 96 may be substantially concentric with the post 38 when the shaft 95 is in one given angular orientation, this position of the disc 96 being indicated in phantom lines in FIG. 21. When the shaft 95 is rotated through 180°, the disc 96 will be swung to a position substantially displaced from concentricity with respect to the post 38, this position of the disc being illustrated in solid lines in FIG. 21 and in FIG. 19.

A vertical slot 98 is provided in the plug 90 along the bore 94 with the lower end of the slot extending to the lower end of the bore 94, and a small bore 99 extends horizontally through the plug 90 through the upper end of the slot 98 and partially coincident with the bore 94.

A folded over leaf spring 100 has one arm which lies within the slot 98, the leaf spring extending around a metal pin 101 which lies within the bore 99. The other end or arm of the leaf spring 100 is of reduced width and is bent as shown at 100a to enter a vertically extending narrow slot 102 in one side of the shaft 95, the lowermost end of the slot 102 extending downwardly through the disc 96 to provide a keyway 102a. The slot 102 is so positioned angularly with respect to the disc 96 that the lower end 100a of the spring 100 may enter the slot 102, and thereby restrain the shaft 95 and the disc 96 against rotation, as shown by its broken line position in FIG. 19, when the disc 96 is in its most eccentric position illustrated by the solid lines in FIG. 21 and in FIG. 19.

In the assembly of these last mentioned parts, the lower end 100a of the spring 100 is laid within the slot 102 in the shaft 95 and the upper, pin receiving end of the spring is laid within an annular recess 103 in the shaft 95. The spring 100 and the shaft and disc assembly 95—96 may then be slid upwardly into the plug 90, the shaft 95 entering the bore 94 and the spring 100 entering the slot 98. With these parts fully inserted into the plug 90, the pin 101 may then be driven into the bore 99 and through the upper loop of the spring 100, the spring 100 and hence the shaft 95 and the disc 96 being thereby restrained against axial movement with respect to the plug 90. The plug may then be inserted into the post 38 and held in fixed position with respect thereto by the screws 91 if this has not previously been done. One or both ends of the pin 101 are preferably knurled such that the pin may be permanently seated within the bore 99.

It will now be seen that the shaft 95 is prevented from vertical axial movement with respect to the plug 90 by the reception of the pin receiving upper end of the spring 100 into the annular recess 103, but that this construction permits rotation of the shaft within the bore 94. When the shaft 95 and the disc 96 are angularly oriented with respect to the plug 90 such that the slot 102 is aligned with the slot 98, the lower end 100a of the spring 100 is free to enter the slot 102 and restrain the shaft 95 against rotation in either direction. This preferably occurs with the disc 96 in its most eccentric position. The lower paper roll 50 thus rests upon the eccentrically disposed disc 96 (FIG. 19) and is thereby held against removal from the post 38, as may be clearly seen in FIG. 19. The upper roll 50, not seen in FIG. 19, of course rests upon the roll shown in the same fashion that is illustrated in FIG. 6.

The lower end 100a of the spring 100 may be displaced or forced out of the slot 102 by the insertion therein of the same or a like key 70 employed in the previously described embodiments of the invention, such displacement being shown in FIG. 19. With the lower end of the spring thus removed from the slot 102, the disc 96 may be rotated to the position illustrated in phantom lines in FIG. 21 wherein it is substantially concentric with the post 38. Paper rolls 50 may then be arranged on the post 38 or may be removed therefrom and the key 70 may be removed. After paper rolls have thus been arranged on the post 38, the disc 96 may be freely rotated until the lower end of the spring 100 snaps into the slot 102 to lock the disc in roll supporting and eccentric position.

Various embodiments of the invention have now been disclosed, each of which employs a novel form of housing or casing which is extremely economical to manufacture, while being sturdy in construction, attractive in appearance and very simple to install. The basic housing or casing also constitutes a substantial portion of the construction employed for supporting the paper rolls.

In the embodiments specifically illustrated in FIGS. 8–18, novel forms of roll-restraining and retaining means cooperate in a novel manner with the basic housing or casing construction to lock paper rolls on or within the dispensing apparatus and to facilitate performance of an attendant's duties. In particular, these embodiments of the invention permit the locking of a paper roll in dispensing position by mere finger-tip pressure against the guard member 67.

In the embodiment of FIGS. 19–21, the novel housing construction cooperates with a different form of roll-retaining means to maintain in dispensing position a paper roll having no interior ring 51. In this connection it should be noted that various parts of the various embodiments of the invention are cooperable in a novel and useful manner. Where apparatus constructed in accordance with the present invention is employed in a locality where toilet tissue with interior rings 51 are not available, the embodiment illustrated specifically in FIGS. 19–24 may be employed. In the event rolls of toilet tissue with interior rings 51 should subsequently become available, the plug 90 and associated apparatus may be removed from the post 38 following removal of the screws 91. The plug 60 or 80 of FIGS. 8–13 or FIGS. 14–18, respectively, along with associated parts may then be installed within the post 38 without modification thereof and without removal of the basic housing construction from a supporting wall. The same key 70 may even be employed for releasing of the locking apparatus.

While there has been described what are at present considered to be the preferred embodiments of the invention, it will be understood that various modifications may be made therein, and it is intended to cover in the appended claims all such modifications as fall within the true spirit and scope of the invention.

I claim:

1. In a dispenser for hollow cored paper rolls, a frame member comprising a back plate adapted to be secured to a vertical supporting structure, a U-shaped rim integral with said back plate and extending forwardly from an upper edge portion of said back plate, a plurality of ribs integral with said back plate and said rim and extending radially inwardly from said rim and from the upper edge of said back plate to form a hub, and a post integral with said back plate, rim and ribs and extending downwardly from said hub; and a casing forming at least the front wall and two side walls of an enclosure, said casing having an inwardly opening groove for receiving the outer edge of said rim whereby said casing may be slid onto said rim and said frame and be supported thereby when said frame member has been secured to a supporting structure.

2. The combination as specified in claim 1 wherein said rim and said ribs comprise horizontal flanges and vertical webs, thereby being generally T-shaped in cross-section.

3. The combination as specified in claim 1 wherein said frame member is a synthetic plastic molding.

4. The combination as specified in claim 1 wherein said casing has an outwardly facing ridge adjacent the upper edge thereof, and a cap is provided having an inwardly opening groove along at least two opposed edges thereof for receiving said ridge, whereby said cap may be slid from front to back onto said casing and be supported thereby.

5. The combination as specified in claim 1 wherein said post is hollow at its lower end, and means are provided, arranged at least in part within said post, for retaining a hollow cored paper roll on said post.

6. In a dispenser for hollow cored paper rolls each having a ring extending radially inward from the core thereof, a frame member comprising a back plate adapted to be secured to a vertical supporting structure, a U-shaped rim integral with said back plate and extending forwardly from an upper edge portion of said back plate, a plurality of ribs integral with said back plate and said rim and extending radially inwardly from said rim and from the upper edge of said back plate to form a hub, and a post integral with said back plate, rim and ribs and extending downwardy from said hub; a casing forming at least the front wall and two side walls of an enclosure, said casing having an inwardly opening groove for receiving the outer edge of said rim whereby said casing may be slid onto said rim and frame and be supported thereby when said frame member has been secured to a supporting structure, said post being hollow at its lower end and extending substantially below the lower edge of said casing and being arranged to receive thereon a plurality of said paper rolls with one of said rolls arranged below said casing in dispensing position and another of said rolls arranged substantially within said casing; and means for retaining a roll in dispensing position on said post, said means including a plurality of balls arranged within and extending through openings in the walls of the hollow portion of said post, a plug rotatably and slidably mounted within said post and biased axially outwardly thereof, said plug having a cylindrical cam having high points maintaining said balls in radially outwardly protruding positions with respect to said post when said plug is in a locking angular orientation and low points permitting radial retraction of said balls when said plug is in a releasing angular orientation, said plug having a second cam engageable by said balls and having high points extending axially inwardly of said post and arranged substantially in axial alignment with the low points of said cylindrical cam, and having low points arranged substantially in axial alignment with the high points of said cylindrical cam, whereby inward movement of said plug causes locking orientation thereof.

7. In a dispenser for hollow cored paper rolls, a frame member comprising a back plate adapted to be secured to a vertical supporting structure, a U-shaped rim integral with said back plate and extending horizontally from the upper edge of said back plate, a plurality of ribs integral with said back plate and said rim and extending radially inwardly from said rim and from an upper edge portion of said back plate to form a hub, and a post integral with said back plate, rim and ribs and extending downwardly from said hub; a casing forming at least the front wall and two side walls of an enclosure, said casing having an inwardly opening groove for receiving the outer edge of said rim whereby said casing may be slid onto said rim and frame and be supported thereby after said frame member has been secured to a supporting structure, said post being hollow at its lower end and extending substantially below the lower edge of said casing and being arranged to receive thereon a plurality of said paper rolls with one of said rolls arranged below said casing in dispensing position and another of said rolls arranged substantially within said casing; and means for retaining a roll in dispensing position on said post, said means including a plug fixedly secured within said post and having an off-center bore extending axially of said post, a shaft rotatable within said bore and restrained from axial movement with respect to said plug, a generally circular disc secured to the lower end of said shaft and perpendicular to the axis thereof, said disc being smaller in diameter than the cores of said paper rolls and being eccentric of said shaft whereby said disc may lie substantially concentric with said post when said shaft is in one angular orientation, and key-released means for retaining said shaft and said disc in another angular orientation wherein said disc prevents removal of a paper roll from said post.

8. In a dispenser for hollow cored paper rolls each having a ring extending radially inward from the core thereof, a casing having an open end, a post extending through said open end of said casing, said post having a hollow outer free end and being arranged to receive thereon a plurality of said paper rolls with one of said rolls arranged outside said casing in dispensing position and another of said rolls arranged substantially within said casing, and means for retaining a roll in dispensing position on said post, said means including a plurality of balls arranged within and extending through openings in the walls of the hollow portion of said post, a plug rotatably and slidably mounted within said post and biased axially outwardly thereof, said plug having a cylindrical cam having high points maintaining said balls in radially outwardly protruding positions with respect to said post when said plug is in a locking angular orientation and low points permitting radial retraction of said balls when said plug is in a releasing angular orientation, said plug having a second cam engageable by said balls and having high points extending axially inwardly of said post and arranged substantially in axial alignment with the low points of said cylindrical cam, and having low points arranged substantially in axial alignment with the high points of said cylindrical cam, whereby inward movement of said plug causes locking orientation thereof.

9. In a dispenser for hollow cored paper rolls each having a ring extending radially inward from the core therof, a casing having an open end, a post extending through said open end of said casing, said post having a hollow outer free end and being arranged to receive thereon a plurality of said paper rolls with one of said rolls arranged outside said casing in dispensing position and another of said rolls arranged substantially within said casing, and means for retaining a roll in dispensing position on said post, said means including a plurality of balls arranged within and extending through openings in the walls of the hollow portion of said post, a plug rotatably and slidably mounted within said post and biased axially outwardly thereof, said plug having a cylindrical cam having high points maintaining said balls in radially outwardly protruding positions with respect to said post when said plug is in a locking angular orientation and low points permitting radial retraction of said balls when said plug is in a releasing angular orientation, said plug having a second cam engageable by said balls and having high points extending axially inwardly of said post and arranged substantially in axial alignment with the low points of said cylindrical cam, and having low points arranged substantially in axial alignment with the high points of said cylindrical cam, whereby inward movement of said plug causes locking orientation thereof, and an end plate covering the outer end of said plug and freely rotatable with respect thereto whereby said plug is guarded against finger rotation, said end plate having an opening therein and the lower end of said plug having a slot therein whereby a key may extend through said plate and into said plug to rotate said plug.

10. The combination as specified in claim 9 wherein means are provided for restraining said plug against rotation away from either of said orientations thereof at least while said plug is maintained in axially outward position.

11. In a dispenser for hollow cored paper rolls each having a ring extending radially inward from the core thereof, a casing having an open end, a post extending through said open end of said casing, said post having a hollow outer free end and being arranged to receive thereon a plurality of said paper rolls with one of said rolls arranged outside said casing in dispensing position and another of said rolls arranged substantially within said casing, and means for retaining a roll in dispensing position on said post, said means including a plurality of balls arranged within and extending through openings in the walls of the hollow portion of said post, and a plug rotatably and slidably mounted within said post and biased axially outwardly threof, said plug having a cylindrical cam having high points maintaining said balls in radially outwardly protruding positions with respect to said post when said plug is in a locking angular orientation and low points permitting radial retraction of said balls when said plug is in a releasing angular orientation, said plug having a second cam engageable by said balls and having high points extending axially inwardly of said post and arranged substantially in axial alignment with the low points of said cylindrical cam, and having low points arranged substanially in axial alignment with the high points of said cylindrical cam, whereby inward movement of said plug causes locking orientation thereof, said plug having ball engaging means arranged axially inwardly of said cylindrical cam for limiting outward movement of said plug.

12. In a dispenser for hollow cored paper rolls each having a ring extending radially inward from the core thereof, a casing having an open end, a post extending through said open end of said casing, said post having a hollow outer free end and being arranged to receive thereon a plurality of said paper rolls with one of said rolls arranged outside said casing in dispensing position and another of said rolls arranged substantially within said casing, and means for retaining a roll in dispensing position on said post, said means including a plurality of balls arranged within and extending through openings in the walls of the hollow portions of said post, and a plug rotatably and slidably mounted within said post and biased axially outwardly thereof, said plug having a cylindrical cam having high points maintaining said balls in radially outwardly protruding positions with respect to said post when said plug is in a locking angular orientation and low points permitting radial retraction of said balls when said plug is in a releasing angular orietnation, said plug having a second cam engageable by said balls and having high points extending axially inwardly of said post and arranged substantially in axial alignment with the low points of said cylindrical cam, and having low points arranged substantially in axial alignment with the high points of said cylindrical cam, whereby inward movement of said plug causes locking orientation thereof, said plug having ball engaging means arranged axially inwardly of said cylindrical cam for limiting outward movement of said plug, said ball engaging means having a plurality of recesses for receiving said balls when said plug is in either locking orientation or releasing orientation, whereby outward biasing of said plug may maintain said plug in either of said orientations, said plug being readily moved from locking orientation to releasing orientation by lifting of said plug such that said balls are withdrawn from said recesses and by rotation of said plug, and an end plate covering the outer end of said plug and freely rotatable with respect thereto whereby said plug is guarded against finger rotation, said end plate having an opening therein and the lower end of said plug having a slot therein whereby a key may extend through said plate and into said plug to rotate said plug.

13. The combination as specified in claim 11 wherein said plug has a plurality of closed ended grooves in the side wall thereof, one for each of said balls, each of said grooves having a first portion extending axially of said post and a second portion extending from the outer end of said first portion at an acute angle, the bottoms of said grooves comprising said cylindrical cam with the bottoms of said first portions comprising the high points thereof, and the sides of said grooves comprising said second cam and said ball engaging means.

14. In a dispenser for hollow cored paper rolls, a casing having an open end, a post extending through said open end of said casing, said post having a hollow outer free end and being arranged to receive thereon a plurality of said paper rolls with one of said rolls arranged outside said casing in dispensing position and another of said rolls arranged substantially within said casing, and means for retaining a roll in dispensing position on said post, said means including a plug fixedly secured within said post and having an off-center bore extending axially of said post, a shaft rotatable within said bore and restrained from axial movement with respect to said plug, a generally circular disc secured to the lower end of said shaft and perpendicular to the axis thereof, said disc being smaller in diameter than the cores of said paper rolls and being eccentric of said shaft whereby said disc may lie substantially concentric with said post when said shaft is in one angular orientation, and key-released means for retaining said shaft and said disc in another angular orientation wherein said disc prevents removal of a paper roll from said post.

15. In a dispenser for hollow cored paper rolls, a casing having an open end, a post extending through said open end of said casing, said post having a hollow outer free end and being arranged to receive thereon a plurality of said paper rolls with one of said rolls arranged outside said casing in dispensing position and another of said rolls arranged substantially within said casing, and means for retaining a roll in dispensing position on said post, said means including a plug fixedly secured within said post and havng an off-center bore extending axially of said post, a shaft rotatable within said bore and restrained from axial movement with respect to said plug, a generally circular disc secured to the lower end of said shaft and perpendicular to the axis thereof, said disc being smaller in diameter than the cores of said paper rolls and being eccentric of said shaft whereby said disc may lie substantially concentric with said post when said shaft is in one angular orientation, said plug having an axially extending slot opening into said bore adjacent the outer end thereof, and a leaf spring arranged within said slot and resiliently bearing against said shaft, said shaft having a slot therein for receiving a portion of said leaf spring, whereby said shaft and said disc may be releasably locked in another angular orientation wherein said disc prevents removal of a paper roll from said post.

16. A dispensing device for rolls of sheet material, comprising, a frame adapted to be attached to a wall, said frame having a portion projecting outwardly with respect to the wall in an overhanging fashion, a depending post fixed at its upper end only to said projecting portion of said frame and extending downwardly therefrom, means on the lower end portion of said post projecting outwardly beyond the periphery of said post for rotatably supporting a roll of sheet material on said post, and resilient spring brake means mounted upon said frame, said spring brake means including a torsion rod depending from said frame along a first axis, a resilient loop integrally formed on the lower end of said rod, said loop extending laterally of said axis and being adapted to bear against the periphery of the roll of sheet material, said loop having a free end, and means on said frame for confining said free end in a position that is off-set with respect to said axis and is off-set, in a direction generally toward said post, with respect to the position which said free end would occupy in an unconfined condition, the confinement of said free end in said position causing said loop to be stressed and causing said loop constantly to be urged toward said post and against the roll of sheet material for retarding rotation of the roll about said post.

17. A dispensing device for rolls of sheet material comprising, a frame adapted to be attached to a wall, said frame having an integral portion projecting outwardly with respect to the wall in an overhanging fashion, an integral projecting rim on said outwardly projecting portion of said frame, an integral depending post fixed at its upper end only to said projecting portion of said frame and extending downwardly therefrom, means on the lower end portion of said post adapted to project outwardly beyond the periphery of said post for rotatably supporting a roll of sheet material on said post, and a casing forming at least the front wall and two side walls of an enclosure for the upper portion of said post, said casing being provided with an inwardly opening groove slidably received upon said rim.

18. A dispensing device for rolls of sheet material comprising, a frame adapted to be attached to a wall, said frame having a portion thereof projecting outwardly with respect to the wall in an overhanging fashion, a depending post fixed at its upper end only to said projecting portion of said frame and extending downwardly therefrom, said post having a hollow lower end portion, and means for retaining a roll in dispensing position on said post, said means including a plurality of balls arranged within and extending through openings in the walls of the hollow portion of said post, a plug rotatably and slidably mounted within said post and biased axially outwardly thereof, said plug having a cylindrical cam having high points maintaining said balls in radially outwardly protruding positions with respect to said post when said plug is in a locking angular orientation and low points permitting radial retraction of said balls when said plug is in a releasing angular orientation, said plug having a second cam engageable by said balls and having high points extending axially inwardly of said post and arranged substantially in axial alignment with the low points of said cylindrical cam, and having low points arranged substantially in axial alignment with the high points of said cylindrical cam, whereby inward movement of said plug causes locking orientation thereof.

19. A dispensing device for rolls of sheet material comprising, a frame adapted to be attached to a wall, said frame having a portion thereof projecting outwardly with respect to the wall in an overhanging fashion, a depending post fixed at its upper end only to said projecting portion of said frame and extending downwardly therefrom, said post having a hollow lower end portion, and means for retaining a roll in dispensing position on said post, said means including a plug fixedly secured within said post and having an off-center bore extending axially of said post, a shaft rotatable within said bore and restrained from axial movement with respect to said plug, a generally circular disc secured to the lower end of said shaft and perpendicular to the axis thereof, said disc being smaller in diameter than the cores of said paper rolls and being eccentric of said shaft whereby said disc may lie substantially concentric with said post when said shaft is in one angular orientation, and key-released means for retaining said shaft and said disc in another angular orientation wherein said disc prevents removal of a paper roll from said post.

References Cited in the file of this patent
UNITED STATES PATENTS

| | | |
|---|---|---|
| 2,058,062 | Cowles | Oct. 20, 1936 |
| 2,668,022 | Fairfield | Feb. 2, 1954 |
| 2,726,824 | Birr | Dec. 13, 1955 |
| 2,786,698 | Bard | Mar. 26, 1957 |
| 3,019,997 | Wooster | Feb. 6, 1962 |